Jan. 28, 1969  G. E. JOHNSON  3,424,556
PRODUCTION OF CARBON BLACK FROM COAL
Filed July 27, 1966
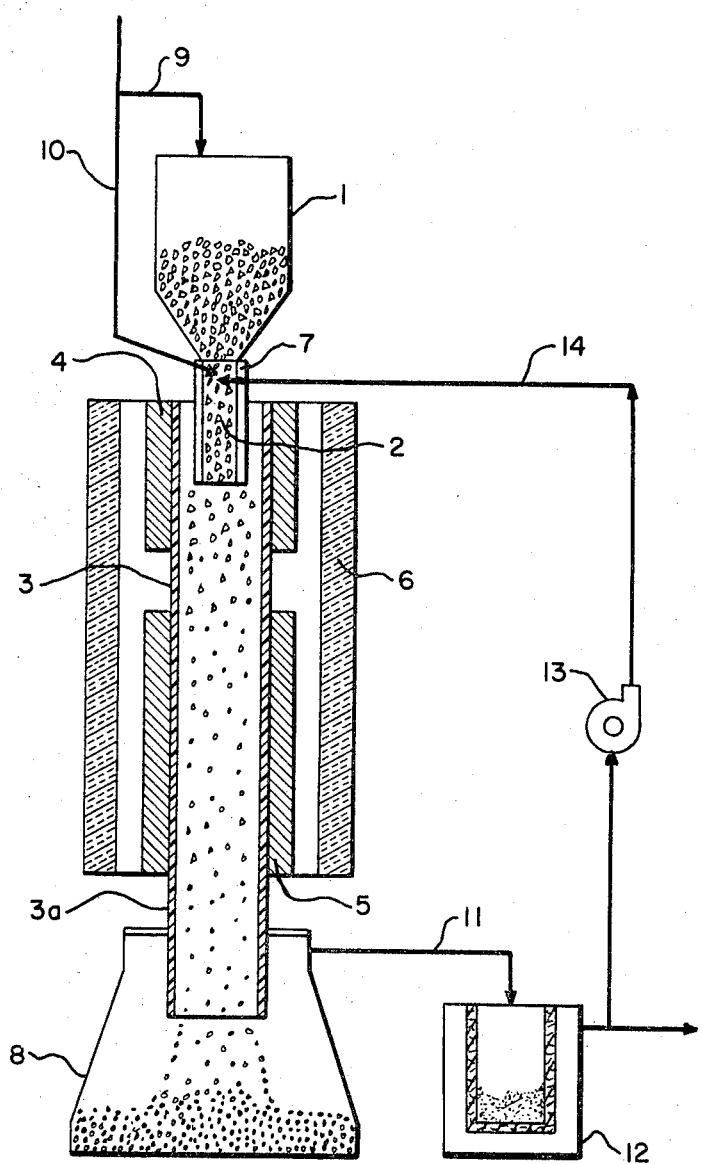
INVENTOR
Glenn E. Johnson
ATTORNEYS
Ernest S. Cohen
M. Howard Silverstein 3,424,556
PRODUCTION OF CARBON BLACK FROM COAL
Glenn E. Johnson, Pittsburgh, Pa., assignor to the United States of America as represented by the Secretary of the Interior
Filed July 27, 1966, Ser. No. 568,353
U.S. Cl. 23—209.4    9 Claims
Int. Cl. C01b 31/00

ABSTRACT OF THE DISCLOSURE

Coal particles are dropped through a heating zone where the particles are heated to a temperature of 900–1800° C. in less than 5 seconds. Gaseous products are removed and cooled immediately after formation. Entrained carbon black is then removed from the cooled gaseous products.

---

This invention relates to the production of carbon black from coal.

Presently, natural gas and petroleum are the raw materials employed in the production of carbon black. However, to the best of our knowledge, no one has even commercially produced carbon black directly from coal.

We have discovered a process which involves rapidly heating fine particles of coal up to a char-producing temperature in a reactive or inert atmosphere; removing resultant gases substantially immediately after they have formed; and removing entrained carbon black particles from the gases.

Therefore, an object of the present invention is to provide a process for producing carbon black from an abundant raw material which is considerably cheaper than natural gas or petroleum.

Another object is to provide a relatively simple process for producing carbon black from coal.

A further object is to produce valuable by-products including char which is useful as an adsorbent for waste water contaminants and as a fuel.

Other objects and advantages will be obvious from the detailed description of the invention appearing in the specification taken with the accompanying drawing in which the figure shows, in vertical cross-section, an apparatus for carrying out the process.

Referring to the figure, reference numeral 1 designates a feed hopper for the raw particulate coal to be treated. During operation, coal falls from the hopper through an unobstructed feed tube 2 which extends into an unobstructed reactor tube 3 such as a ceramic tube. An exemplary coal flow rate is 75 pounds of coal per hour per square foot of reactor tube cross-sectional area. A pair of electrical resistance heaters 4 and 5 surround the feed and reactor tubes, and heat the coal particles to and beyond their plastic range as they fall rapidly therethrough. That part of the tube 3 surrounded by the heaters can be covered with insulation 6 to maintain temperature control. Feed tube 2 can be steam-cooled by way of jacket 7 to maintain the tube below plastic range temperatures and thereby prevent coal or coke particles from caking on the tube casing.

Upper heater 4 heats the coal past its plastic range while lower heater 5 raises the particles to a temperature ranging from about 900° C. up to about 1800° C. A one-step heating technique could be employed, but such an operation creates a greater tube plugging problem in small equipment than that encountered with the two-step heating process. The raw coal becomes rapidly heated to the desired temperature in this manner. Such rapid heating is essential in order to form the desired carbon black which becomes suspended as fine particles in the gases in the heating zone. One theory advanced is that rapid heating causes the volatile matter in the coal to expand at such a rate as to burst apart the coal particles and thus permit formation of fine carbon black particles. Although this theory suggests that those coals with higher volatile content would produce greater yields of carbon black, any rank of coal among bituminous, lignite and anthracite coals can be employed.

In order to facilitate rapid heating and bursting of the falling coal, it should be in powdered form having a particle size of less than about 300 mesh. Larger particle sizes would require a greater temperature differential between the heating means and coal in order to attain rapid heating and bursting. Dispersed particles of minus 300 mesh coal can be heated to the desired temperature in less than about 5 seconds. In a free falling zone, the fine coal is heated to this temperature in less than about 2 seconds.

Char formed during the heat treatment continues to fall through tube 3 into uninsulated extension portion 3a which projects from the bottom of heater 5 into a receiver 8. Substantially immediately after coal volatiles and gaseous by-products form in the heating zone, they are swept out of the zone (along with suspended carbon black) through extension 3a into receiver 8 by a carrier gas which is added to the system by way of conduits 9 or 10. Such rapid removal of entrained carbon black prevents carbonization of the black to a less desirable carbon product at the elevated reactor tube temperature. As the gaseous material containing entrained carbon black passes through extension 3a and into the receiver, it is cooled below the heater temperature by environmental conditions. A cooling jacket can be maintained around extension 3a to facilitate cooling.

Char collects in the bottom of receiver 8 while gaseous material containing suspended carbon black is taken off from the upper section of the receiver and conducted by way of line 11 to a gas-solids separator such as a wool felt bag filter 12 as shown in the figure. An electrostatic precipitator can also be used as a separating device.

Gases evolving from the separator can then be removed and treated in further by-product recovery steps or can be recycled by a pump 13 and conduit 14 to the top of reactor tube 3 to act as a supplemental carrier gas.

Physically, the carrier gas injected through conduits 9 or 10 aids in preventing bridging or plugging of the feed tube 2 and reactor tube 3, and moves gaseous material formed during the heat treatment out the bottom of the unobstructed heating zone along with char. Although the flow rate of the gas to the zone need only be sufficient enough to concurrently move the gaseous material with the char, the carrier gas can be supplied at a rate sufficient to accelerate the substantially free-falling movement of the coal and char particles. For a −300 mesh coal feed rate 75 pounds per hour per square foot of reactor tube cross-sectional area, an exemplary carrier gas feed rate is 0.01 to 0.2 cubic feet per minute.

Rather than injecting a carrier gas into the zone, gaseous materials formed therein can be rapidly moved from the zone by a suitably located exhaust pump and conduit.

The particular carrier gas employed depends upon the desired by-products. If only the products within the coal itself are desired, an inert gas such as nitrogen, helium, flue gas or mixtures of the same can be used. To form other by-products during the process, ammonia could be used as the carrier gas in which case HCN would form. Likewise, gaseous sulfur could be used if it is desired to produce carbon disulfide as a by-product. Oxidizing gases such as oxygen could be employed, in which case partial combustion of the coal would take place to produce hot flue gases which would then aid in heating incoming coal particles. Therefore, if oxidizing gases were utilized, other forms of heating, less expensive than efficient electrical resistance heaters, could be utilized.

A horizontally-oriented as well as a vertically-oriented heating system could be used for heating the dispersed coal particles. In such an operation, powdered coal would be blown in a dispersed manner by a carrier gas horizontally through the unobstructed heating zone so that the particles would remain at the desired elevated temperatures for only a few seconds.

The following tables compare carbon black prepared from coal by the process of this invention with carbon black produced through other sources.

TABLE 1

| Analyses, pct. | Carbon black [1] from coal and ammonia (10 tests) | Carbon black [1] from coal and nitrogen (13 tests) | Other sources of carbon black | |
|---|---|---|---|---|
| | | | ([2]) | ([3]) |
| C | 94.7–95.8 | 94.2–96.8 | 90–99 | 85–99 |
| $H_2$ | 0.5–1.1 | 0.7–1.6 | 0.5–1.0 | 0.4–1.8 |
| $N_2$ | 1.9–3.6 | .7–0.9 | .02–.09 | .01–1.1 |
| $O_2$ | 0.3–0.5 | .6–1.7 | 2.5–14 | .5–14 |
| S | .4–.6 | .7–0.9 | 0.1–0.4 | .1–0.8 |
| Ash | .3–.7 | .2–1.3 | .02–15 | .01–.84 |
| Volatile matter | 2.2–5.5 | 1.7–12 | .04–20 | .78–17.9 |
| B.t.u./lb | 14,000 | 14,000 | 13,000–14,400 | 12,271–14,769 |
| Particle size, microns | 0.04–0.3 | ([4]) | .013–.274 | |

[1] To obtain carbon black by the process of this invention, minus 300 mesh high volatile bituminous coal was allowed to continuously fall substantially freely through an approximately 12 inch long preheating zone maintained at about 850° C. and through an approximately 20 inch long main heating zone maintained at about 1250° C.
[2] Mantell, C. L., Industrial Carbon. D. Van Nostrand Co., 1946, pp. 59–60.
[3] Perrot, G. S. J. Bureau of Mines Bull. 192, 1922, p. 73.
[4] About 0.25 max.

TABLE 2

| Property | Type of carbon black | | |
|---|---|---|---|
| | Carbon black from coal | Company A | |
| | | Fine thermal black | Medium thermal black |
| BET surface area, m.$^2$/g | 10–18 | 13 | 8 |
| ASTM iodine absorption, mg./g | 12–15 | 15 | 4 |
| Electron microscope surface | 14–18 | 18 | 9 |
| Tint, pct. of HAF (standard high abrasion furnace black) | 36 | 30 | |
| Oil absorption, cc./g | 0.53–0.65 | 0.4–0.5 | 0.4 |
| Benzene extract, pct | 2.1–3.7 | 1–1.8 | 0.3 |
| Ash, pct | 0.40 | 0.1 | 0.16 |
| Total sulfur, pct | 0.61 | | |
| DPG (diphenyl guanadine) adsorption, milliequivalents/g | 11.33 | 0.8 | 1.8 |
| Slurry, pH | 4.45 | 8.1 | 8.0 |

TABLE 3.—COMPOUNDING TEST WITH NATURAL RUBBER, ASTM FORMULATION

| Rubber properties | Carbon black | |
|---|---|---|
| | Carbon black from coal | Company B, fine thermal black |
| Tensile, p.s.i.: | | |
| 15 min. cure | 3,285 | 3,005 |
| 30 min. cure | 3,150 | 3,335 |
| Elongation, pct.: | | |
| 15 min. cure | 680 | 680 |
| 30 min. cure | 620 | 645 |
| Modulus, 300 pct.: | | |
| 15 min. cure | 525 | 430 |
| 30 min. cure | 695 | 615 |
| Hardness: | | |
| 15 min. cure | 49 | 42 |
| 30 min. cure | 54 | 47 |
| Mooney viscosity at 250° F | 23.2 | 28.5 |

Carbon black produced by the process of the present invention is highly suitable for use in the compounding of rubber. Furthermore, char produced during the process is useful as an adsorbent and as a fuel either before or after its use as an adsorbent. Finally, other desirable chemicals such as hydrogen cyanide and carbon disulfide can be produced by merely selecting the proper gaseous environment for the heating zone.

What is claimed is:
1. A process for producing carbon black consisting of
  (a) rapidly heating dispersed, about 300 minus mesh particles of coal up to a temperature within the range of from about 900° C. to about 1800° C. in less than about 5 seconds to form char and gaseous material containing entrained carbon black particles;
  (b) cooling said gaseous material substantially immediately after it has formed;
  (c) removing said entrained carbon black from said cooled gaseous material; and
  (d) recovering said carbon black as product.
2. The process of claim 1 wherein said heating step is carried out in the presence of a gas selected from the group consisting of ammonia, an oxidizing gas, gaseous sulfur and a gas chemically inert with respect to said coal.
3. The process of claim 1 wherein said rapid heating step comprises passing said dispersed particles of coal rapidly through an unobstructed heating zone, and wherein said cooling step comprises moving said gaseous material into a cooling zone from said heating zone.
4. The process of claim 1 wherein said coal is heated to said temperature in less than about 2 seconds.
5. The process of claim 3 wherein said particles of coal fall substantially freely through said heating zone, and said char, as it forms, falls substantially freely from said heating zone into said cooling zone and wherein a gas is injected into said heating zone to move said gaseous material formed in said heating zone into said cooling zone concurrently with said char, and further comprising separating said char from said gaseous material in said cooling zone.
6. The process of claim 3 wherein said coal is heated to said temperature in less than about 2 seconds.
7. The process of claim 5 wherein said coal is heated up to a temperature of about 1250° C. in said heating zone, and wherein said coal is heated to said temperature in less than about 2 seconds.
8. The process of claim 5 wherein said gas injected into said heating zone is selected from the group consisting of ammonia, an oxidizing gas, sulfur and a gas chemically inert with respect to said coal.
9. The process of claim 6 wherein said heating zone contains a gas selected from the group consisting of ammonia, an oxidizing gas, gaseous sulfur and a gas chemically inert with respect to said coal.

References Cited

UNITED STATES PATENTS 2,440,424  4/1948  Wiegand et al. _____ 23—209.4
3,073,681  1/1963  Ceresna _____ 23—209.4

FOREIGN PATENTS 1,024,474  3/1966  Great Britain.

EDWARD J. MEROS, *Primary Examiner.*

U.S. Cl. X.R.

23—151, 206, 209.2, 209.6; 201—29, 34; 48—210